(12) United States Patent
Shiomi

(10) Patent No.: US 9,726,945 B2
(45) Date of Patent: Aug. 8, 2017

(54) LIQUID CRYSTAL DISPLAY DEVICE

(71) Applicant: Sharp Kabushiki Kaisha, Osaka-shi (JP)

(72) Inventor: Makoto Shiomi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 167 days.

(21) Appl. No.: 14/400,657

(22) PCT Filed: May 16, 2013

(86) PCT No.: PCT/JP2013/063623
§ 371 (c)(1),
(2) Date: Nov. 12, 2014

(87) PCT Pub. No.: WO2013/172400
PCT Pub. Date: Nov. 21, 2013

(65) Prior Publication Data
US 2015/0138488 A1    May 21, 2015

(30) Foreign Application Priority Data

May 17, 2012 (JP) ................................. 2012-113831

(51) Int. Cl.
*G02F 1/23* (2006.01)
*G02F 1/1343* (2006.01)
(Continued)

(52) U.S. Cl.
CPC .. *G02F 1/134336* (2013.01); *G02F 1/133603* (2013.01); *G02F 1/136286* (2013.01);
(Continued)

(58) Field of Classification Search
CPC .................... G09G 2300/0452; G02F 2201/52
(Continued)

(56) References Cited

U.S. PATENT DOCUMENTS 5,006,840 A * 4/1991 Hamada .............. G02F 1/13306
345/88
2006/0202927 A1* 9/2006 Lee ........................ G02F 1/1368
345/88
(Continued)

FOREIGN PATENT DOCUMENTS

JP       2008152244 A   7/2008
WO   WO-2004027503 A1   4/2004
(Continued)

OTHER PUBLICATIONS

International Search Report PCT/ISA/210 for International Application No. PCT/JP2013/063623 Dated Aug. 7, 2013.
(Continued)

*Primary Examiner* — Nimeshkumar Patel
*Assistant Examiner* — Christopher Raabe
(74) *Attorney, Agent, or Firm* — Harness, Dickey & Pierce, P.L.C.

(57) ABSTRACT

The implementation of a superhigh-definition liquid crystal display device with a diagonal of 30 inches or more and a resolution of 100 ppi or more is facilitated. There is provided a direct-view-type liquid crystal display device that includes a display portion in which a plurality of pixels are placed in a matrix, the display portion whose diagonal is 30 inches or more, in which the resolution of the display portion is 100 pixels or more per inch, the plurality of pixels include first to fourth pixels, and one of the first to fourth pixels is an RG-type formed of a red subpixel and a green subpixel and another of the first to fourth pixels is a BH-type formed of a blue subpixel and a green, yellow, or white subpixel.

9 Claims, 22 Drawing Sheets

(51) Int. Cl.
  *G09G 3/36* (2006.01)
  *G02F 1/1362* (2006.01)
  *G02F 1/1335* (2006.01)

(52) U.S. Cl.
  CPC ......... *G09G 3/3607* (2013.01); *G09G 3/3666* (2013.01); *G02F 1/133514* (2013.01); *G02F 2201/52* (2013.01); *G09G 2300/0426* (2013.01); *G09G 2300/0452* (2013.01); *G09G 2310/0205* (2013.01); *G09G 2320/0209* (2013.01)

(58) Field of Classification Search
  USPC ......................................................... 349/106
  See application file for complete search history.

(56) References Cited

U.S. PATENT DOCUMENTS

| | | | | |
|---|---|---|---|---|
| 2008/0106678 A1* | 5/2008 | Wang | ..................... | G02B 5/201 349/108 |
| 2008/0174849 A1 | 7/2008 | Asao | | |
| 2008/0316235 A1 | 12/2008 | Okazaki et al. | | |
| 2009/0073099 A1* | 3/2009 | Yeates | ................... | G02F 1/1362 345/88 |
| 2009/0073358 A1 | 3/2009 | Taguchi et al. | | |
| 2009/0179842 A1* | 7/2009 | Chen | ................. | G02F 1/133514 345/88 |
| 2011/0156992 A1* | 6/2011 | Moon | ................. | G09G 3/3607 345/84 |

FOREIGN PATENT DOCUMENTS

| | | |
|---|---|---|
| WO | WO-2006019025 A1 | 2/2006 |
| WO | WO-2007119288 A1 | 10/2007 |

OTHER PUBLICATIONS

Written Opinion of the International Searching Authority PCT/ISA/237 for International Application No. PCT/JP2013/063623 dated Aug. 7, 2013.

* cited by examiner

LIQUID CRYSTAL DISPLAY DEVICE

TECHNICAL FIELD

The present invention relates to liquid crystal display devices.

BACKGROUND ART

Although a common liquid crystal display device has pixels, each being formed of three subpixels: red (R), green (G), and blue (B) subpixels, the technology (the PenTile pixel structure) by which one pixel is formed of two subpixels: green and red or blue subpixels for the purpose of reducing power consumption has been proposed and widely used in small liquid crystal display devices (refer to PTL 1).

CITATION LIST

Patent Literature

PTL 1: International Publication No. WO2004/027503

SUMMARY OF INVENTION

Technical Problem

The liquid crystal display device grows in size and the definition thereof becomes higher, but, when the diagonal of a display portion becomes 30 inches or more and the definition of the display portion (the screen) becomes 100 ppi (100 pixels per inch) or more, the implementation of a source driver that drives a data signal line becomes difficult, and there is fear for the mass production of such a liquid crystal display device.

An object of the present invention is to facilitate the implementation of a liquid crystal display device with a diagonal of 30 inches or more and a resolution of 100 ppi or more.

Solution to Problem

This liquid crystal display device is a direct-view-type liquid crystal display device that includes a display portion in which a plurality of pixels are placed in a matrix, the display portion whose diagonal is 30 inches or more, wherein the resolution of the display portion is 100 pixels or more per inch, the plurality of pixels include first to fourth pixels, and one of the first to fourth pixels is an RG-type formed of a red subpixel and a green subpixel and another of the first to fourth pixels is a BH-type formed of a blue subpixel and a green, yellow, or white subpixel.

This liquid crystal display device has the display portion including the RG-type pixels and the BH-type pixels, and the diagonal of the display portion is 30 inches or more and the viewing-and-listening distance in a normal high-definition television is 1 m or more; therefore, if the resolution of the display portion is 100 ppi or more, it is impossible to recognize (discern) one pixel with human visual ability. Moreover, it is difficult for many viewers to identify visually one pixel even at a viewing-and-listening distance of 1H (which is the same distance as the vertical screen size), let alone a normal viewing-and-listening distance of 3H (which is three times larger than the vertical screen size). In addition, since a G or Y subpixel which humans can recognize clearly is included in each pixel, it is possible to reduce the number of pixels with little reduction in image quality. As a result, it is possible to facilitate the implementation of a liquid crystal display device with a diagonal of 30 inches or more and resolution of 100 ppi or more.

This liquid crystal display device can also adopt a configuration in which, when a column direction is set as a scanning direction, two subpixels are arranged in a row direction in each of the first to fourth pixels, and, in one of two columns of pixels adjacent to each other, the first and second pixels are arranged sequentially, in the other of the two columns of pixels adjacent to each other, the third and fourth pixels are arranged sequentially, the first and third pixels are adjacent to each other in a row direction, and the second and fourth pixels are adjacent to each other in the row direction.

This liquid crystal display device can also adopt a configuration in which each of the first and second pixels is the RG-type and each of the third and fourth pixels is the BH-type.

This liquid crystal display device can also adopt a configuration in which the liquid crystal display device includes fifth to eighth pixels, and, in each of the fifth to eighth pixels, two subpixels are arranged in the row direction, and, in one of the two columns of pixels, the first and second pixels and the fifth and sixth pixels are arranged sequentially, in the other of the two columns of pixels, the third and fourth pixels and the seventh and eighth pixels are arranged sequentially, the fifth and seventh pixels are adjacent to each other in the row direction, and the sixth and eighth pixels are adjacent to each other in the row direction.

This liquid crystal display device can also adopt a configuration in which each of the fifth and sixth pixels is the BH-type and each of the seventh and eighth pixels is the RG-type.

This liquid crystal display device can also adopt a configuration in which the red subpixel included in the first pixel and the red subpixel included in the second pixel are adjacent to each other in the column direction, and the blue subpixel included in the fifth pixel and the blue subpixel included in the sixth pixel are adjacent to each other in the column direction.

This liquid crystal display device can also adopt a configuration in which the green subpixel of the second pixel and the green or yellow subpixel of the fifth pixel are placed diagonally across from each other.

This liquid crystal display device can also adopt a configuration in which the green subpixel of the second pixel and the green or yellow subpixel of the fifth pixel are adjacent to each other in the column direction.

This liquid crystal display device can also adopt a configuration in which the first and third pixels are connected to a first scanning signal line, and the second and fourth pixels are connected to a second scanning signal line, and the first and second scanning signal lines are selected at the same time. In this case, a configuration can also be adopted in which first to fourth data signal lines are arranged in this order, the red subpixel of the first pixel and the green subpixel of the fifth pixel are connected to the first data signal line, the red subpixel of the second pixel and the green subpixel of the sixth pixel are connected to the second data signal line, the green subpixel of the second pixel and the blue subpixel of the sixth pixel are connected to the third data signal line, and the green subpixel of the first pixel and the blue subpixel of the fifth pixel are connected to the fourth data signal line.

This liquid crystal display device can also adopt a configuration in which each of the first and fourth pixels is the RG-type and each of the second and third pixels is the BH-type.

This liquid crystal display device can also adopt a configuration in which the green subpixel of the first pixel and the green or yellow subpixel of the second pixel are placed diagonally across from each other.

This liquid crystal display device can also adopt a configuration in which, in the first to fourth pixels, the area of the green or yellow subpixel is equal to the area of the red or blue subpixel.

This liquid crystal display device can also adopt a configuration in which the liquid crystal display device includes a direct backlight, the backlight includes a red LED, a blue LED, and a green LED, and the brightness of green is set to be lower than the brightness of red and blue.

This liquid crystal display device can also adopt a configuration in which a liquid crystal layer of each subpixel is in a multi-domain vertical alignment mode.

This liquid crystal display device can also adopt a configuration in which the display portion is divided into a first region on the upstream side in a scanning direction and a second region on the downstream side in the scanning direction, and a plurality of data signal lines formed in the first region and a plurality of data signal lines formed in the second region are separated from each other, and scanning of the first region and scanning of the second region are concurrently performed.

Advantageous Effects of Invention

According to the present invention, it is possible to facilitate the implementation of a liquid crystal display device with a diagonal of 30 inches or more and resolution of 100 ppi or more.

DESCRIPTION OF EMBODIMENTS

Embodiments of the present invention will be described as follows based on FIGS. 1 to 22.

[Embodiment 1]

Figure 1:
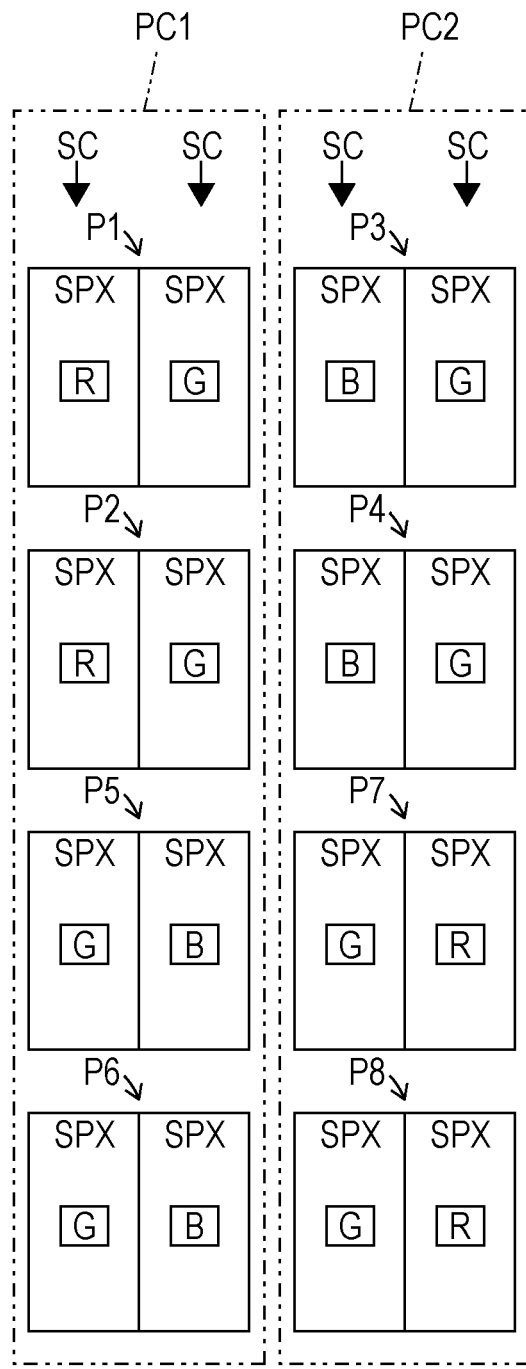
FIG. 1 is a schematic diagram depicting the pixel array of a liquid crystal display device of Embodiment 1.
Figure 2:
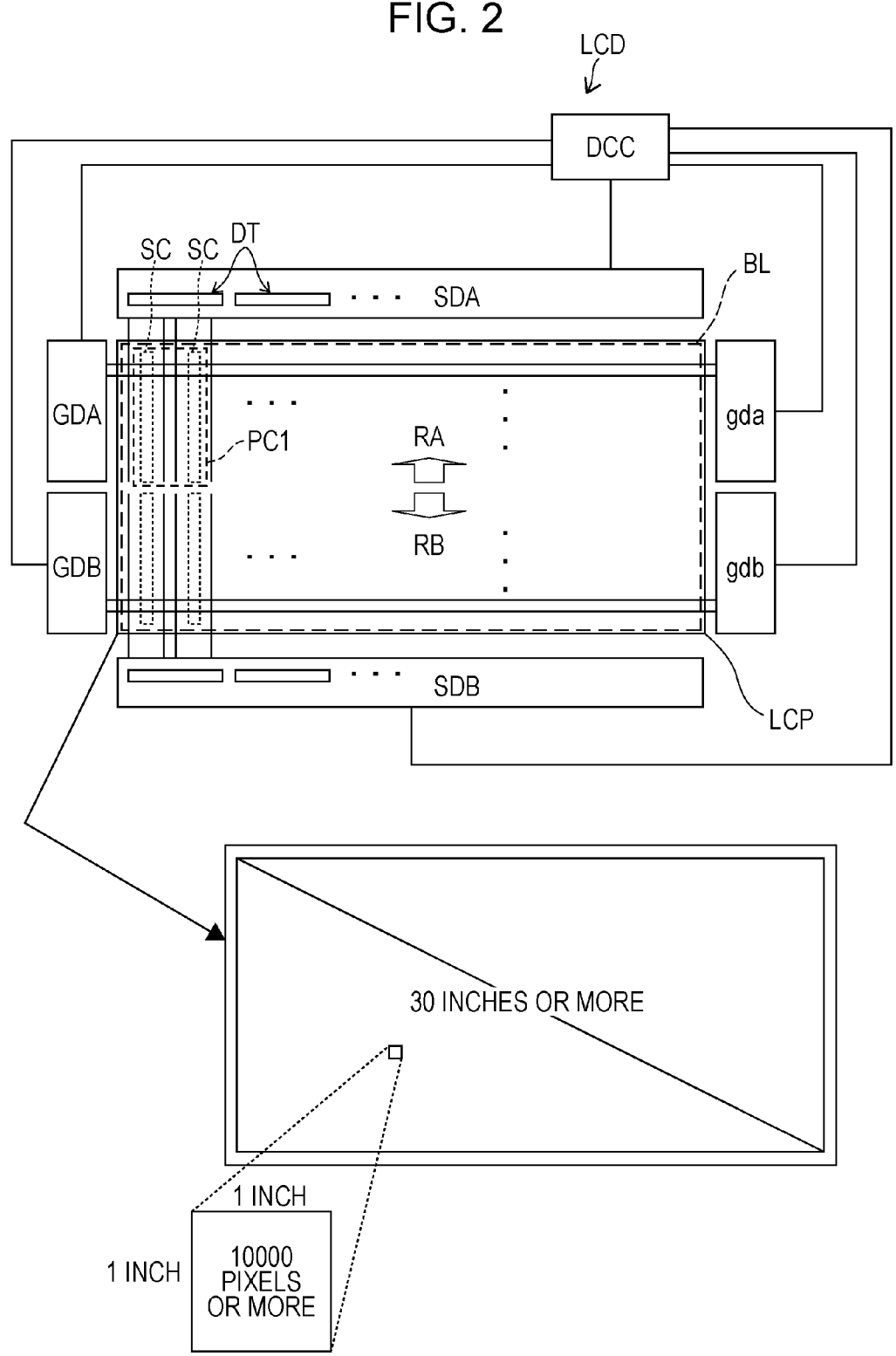
FIG. 2 is a schematic diagram depicting the general configuration of the liquid crystal display device of Embodiment 1.

As depicted in FIG. 1, a liquid crystal display device LCD of Embodiment 1 includes a liquid crystal panel LCP, a display control circuit DCC, first and second source drivers SDA and SDB, first to fourth gate drivers GDA, GDB, gda, and gdb, and a backlight BL. The liquid crystal panel LCP includes a plurality of data signal lines extending in a column direction (a scanning direction), a plurality of scanning signal lines extending in a row direction (a horizontal direction), and a plurality of pixels arranged in a matrix, and is of the direct-view-type with a display portion whose diagonal is 30 inches (1 inch is 0.0254 [m]) or more and resolution is 100 ppi (100 pixels per 1 inch and 10000 pixels in an area 1 inch square) or more. The number of pixels in a horizontal direction is greater than 1920 pixels (so-called 2K) complying with high-definition television broadcast standards and is assumed to be so-called 4K (4000 pixels) such as 3840 pixels of QFHD or 4096 pixels of DCI, for example. Moreover, with an increase in the panel size, the number of pixels is also increased, and 8K (7680 pixels) of ultra-high-definition television or the like is also included.

Incidentally, based on the premise that it is difficult to recognize each pixel, the number of pixels in a horizontal direction of this liquid crystal display device is not limited to above-described 2K, 4K, 8K, or the like, and it goes without saying that it is also possible to set the number of pixels at 5K, 6K, 7K, or the like in accordance with the screen size, for example.

The first source driver SDA is formed of a plurality of driver chips DT arranged in the row direction near an upper edge of a panel, and the second source driver SDB is formed of a plurality of driver chips DT arranged in the row direction near a lower edge of the panel.

The aspect ratio (width:height) of the display portion is generally 16:9 or 4:3, but it goes without saying that the aspect ratio is not limited thereto.

Moreover, as a liquid crystal mode, a multi-domain vertical alignment (VA) mode with high contrast and good viewing angle characteristics is desirable. The reason is that, since the number of red and blue pixels is smaller than the number of green pixels and the red and blue pixels are placed more sparsely than the green pixels, color shift occurs in a liquid crystal mode with a narrow viewing angle and contamination (cloud caused by color mixture) between adjacent pixels easily occurs in a liquid crystal with low contrast.

The liquid crystal panel LCP is a so-called vertical split-type panel, and a data signal line in a first region RA on the upstream side in the scanning direction and a data signal line in a second region RB on the downstream side in the scanning direction are separated from each other and scanning of the first region RA and scanning of the second region RB are concurrently performed. Incidentally, the first and third gate drivers GDA and gda perform scanning of the first region RA, and the second and fourth gate drivers GDB and gdb perform scanning of the second region RB. Moreover, the first source driver SDA performs the driving of the data signal line in the first region RA, and the second source driver SDB performs the driving of the data signal line in the second region RB.

Figure 3:
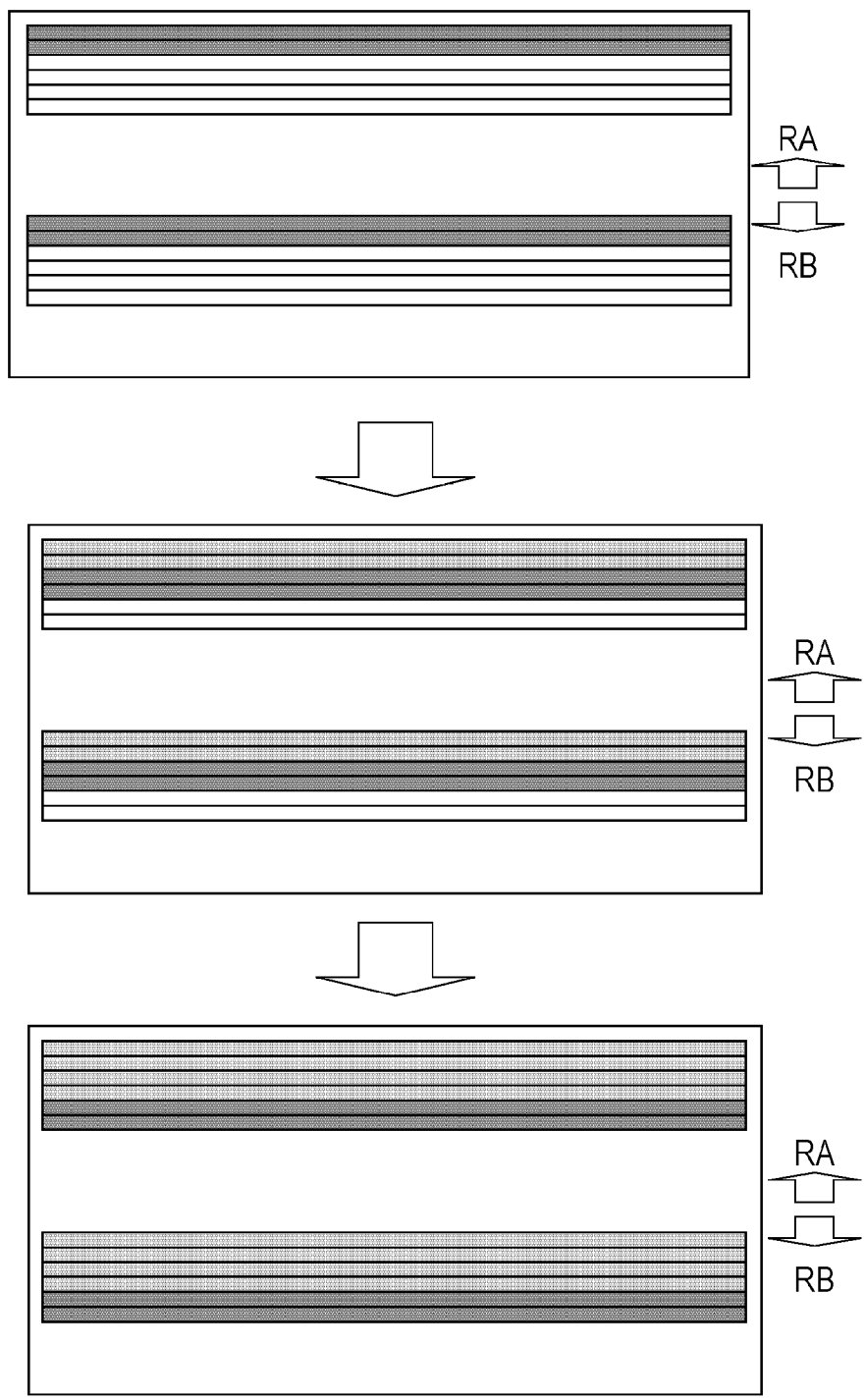
FIG. 3 is a schematic diagram depicting a driving method (vertical split driving) of Embodiment 1.

In addition, the liquid crystal panel LCP is a so-called double source-type panel, and two data signal lines are provided for one column of subpixels (SC) in the first region RA, for example. That is, in the liquid crystal display device LCD, as depicted in FIG. 3, it is possible to select two scanning signal lines in the first region RA and two scanning signal lines in the second region RB at the same time and secure the pixel charging rate even at a time when high-speed driving is being performed.

As depicted in FIG. 1, the plurality of pixels of the display portion are classified into an RG-type pixel formed of a red (R) subpixel SPX and a green (G) subpixel SPX which are arranged in the row direction and a BG-type pixel formed of a blue subpixel and a green subpixel which are arranged in the row direction, and, in each column of pixels (PC1 or PC2), two RG-type pixels and two BG-type pixels are alternately placed; in each row of pixels, one RG-type pixel and one BG-type pixel are alternately placed. Furthermore, in one (SC) of the two columns of subpixels adjacent to each other, two R subpixels and two G subpixels are alternately placed; in the other (SC), two B subpixels and two G subpixels are alternately placed.

Specifically, in one (PC1) of the two columns of pixels adjacent to each other, a pixel P1, a pixel P2, a pixel P5, and a pixel P6 are arranged sequentially in this order; in the other (PC2), a pixel P3, a pixel P4, a pixel P7, and a pixel P8 are arranged sequentially in this order, the pixel P1 and the pixel P3 are adjacent to each other in the row direction, the pixel P2 and the pixel P4 are adjacent to each other in the row direction, the pixel P5 and the pixel P7 are adjacent to each other in the row direction, the pixel P6 and the pixel P8 are adjacent to each other in the row direction, in each of the pixels P1 to P8, two subpixels SPX are arranged in the row direction, each of the pixel P1, the pixel P2, the pixel P7, and the pixel P8 is the RG-type, and each of the pixel P3, the pixel P4, the pixel P5, and the pixel P6 is the BG-type.

In addition, the R subpixel SPX of the pixel P1 and the R subpixel SPX of the pixel P2 are adjacent to each other in the column direction, the B subpixel SPX of the pixel P5 and the B subpixel SPX of the pixel P6 are adjacent to each other in the column direction, and the R subpixel SPX of the pixel P2 and the B subpixel SPX of the pixel P5 pixel are placed diagonally across from each other.

Figure 4:
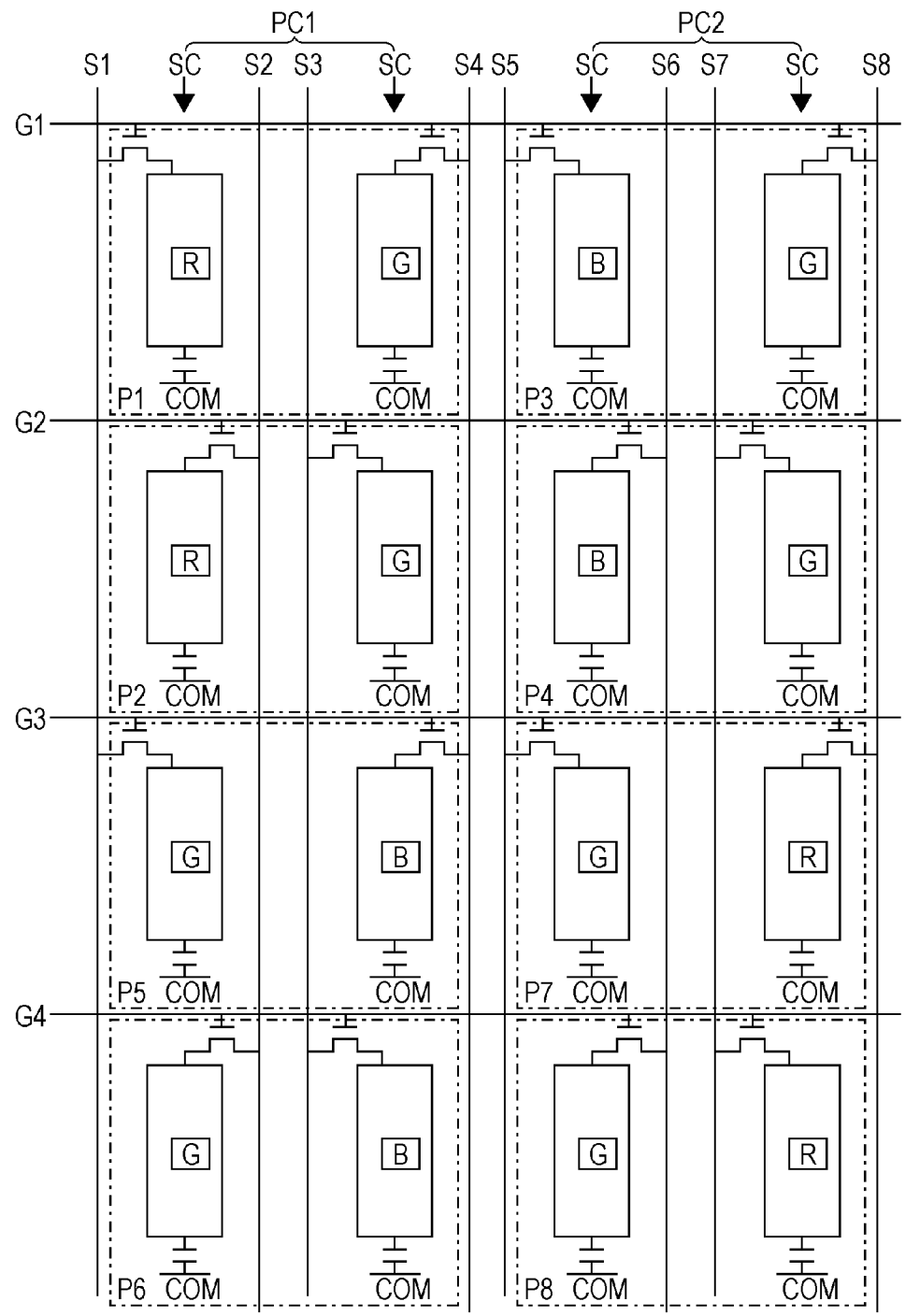
FIG. 4 is a schematic diagram depicting the pixel structure of the liquid crystal display device of Embodiment 1.

FIG. 4 is a schematic diagram depicting the pixel structure of the pixels P1 to P8, and the following is about the column of pixels PC1, for example (data signal lines S1 to S4 corresponding to the column of pixels PC1 are arranged in this order). That is, a pixel electrode corresponding to the R subpixel of the pixel P1 is connected to the data signal line S1 and a scanning signal line G1 via a transistor, a pixel electrode corresponding to the R subpixel of the pixel P2 is connected to the data signal line S2 and a scanning signal line G2 via a transistor, a pixel electrode corresponding to the G subpixel of the pixel P5 is connected to the data signal line S1 and a scanning signal line G3 via a transistor, and a pixel electrode corresponding to the G subpixel of the pixel P6 is connected to the data signal line S2 and a scanning signal line G4 via the transistor. Moreover, a pixel electrode corresponding to the G subpixel of the pixel P1 is connected to the data signal line S4 and the scanning signal line G1 via a transistor, a pixel electrode corresponding to the G subpixel of the pixel P2 is connected to the data signal line S3 and the scanning signal line G2 via a transistor, a pixel electrode corresponding to the B subpixel of the pixel P5 is connected to the data signal line S4 and the scanning signal line G3 via a transistor, and a pixel electrode corresponding to the B subpixel of the pixel P6 is connected to the data signal line S3 and the scanning signal line G4 via a transistor. Incidentally, between the pixel electrode corresponding to each subpixel and a common electrode COM, liquid crystal capacity is formed.

Figure 5:
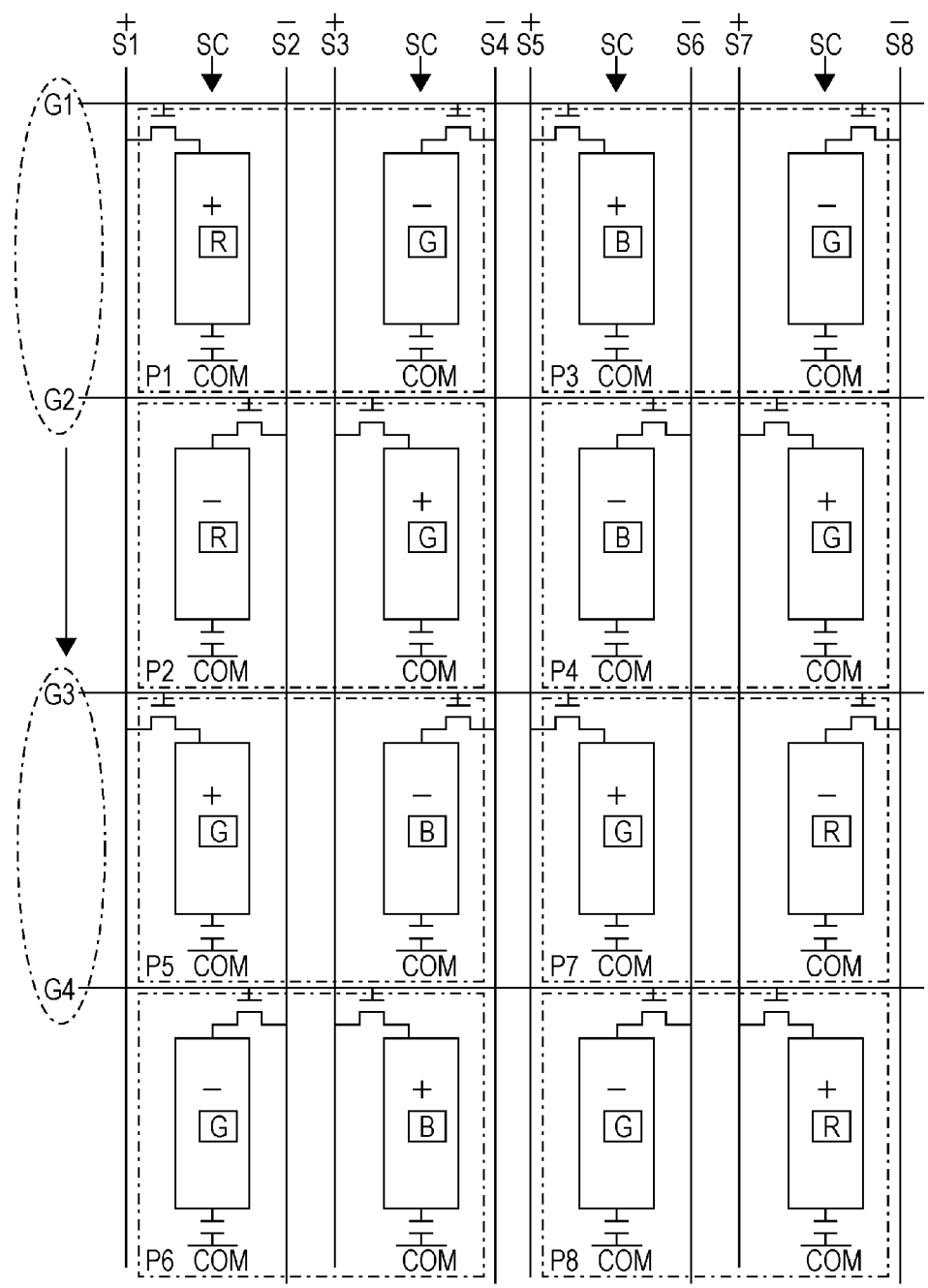
FIG. 5 is a schematic diagram depicting a method of driving each pixel of FIG. 4.

FIG. 5 is a schematic diagram depicting a method of driving the pixels P1 to P8, and the following is about the pixels P1, P2, P5, and P6, for example. That is, when the scanning signal lines G1 and G2 are selected (scanned) at the same time, a plus signal potential is written into the pixel electrode corresponding to the R subpixel of the pixel P1 from the data signal line S1, a minus signal potential is written into the pixel electrode corresponding to the G subpixel of the pixel P1 from the data signal line S4, a minus signal potential is written into the pixel electrode corresponding to the R subpixel of the pixel P2 from the data signal line S2, and a plus signal potential is written into the pixel electrode corresponding to the G subpixel of the pixel P2 from the data signal line S3. Then, when the scanning signal lines G3 and G4 are selected (scanned) at the same time, a plus signal potential is written into the pixel electrode corresponding to the G subpixel of the pixel P5 from the data signal line S1, a minus signal potential is written into the pixel electrode corresponding to the B subpixel of the pixel P5 from the data signal line S4, a minus signal potential is written into the pixel electrode corresponding to the G subpixel of the pixel P6 from the data signal line S2, and a plus signal potential is written into the pixel electrode corresponding to the B subpixel of the pixel P6 from the data signal line S3.

This liquid crystal display device has the display portion formed of the RG-type pixels and the BG-type pixels, but, in view of the fact that the diagonal of the display portion is 30 inches or more and the normal viewing-and-listening distance is 1 m or more, if the resolution of the display portion is 100 ppi or more, it is impossible to recognize (discern) one pixel with human visual ability. In addition, since the G subpixel which humans can recognize clearly is included in each pixel, it is possible to reduce the number of pixels (reduce the number of driver chips DT) in the row direction (the horizontal direction) to ⅔ (as compared to a case in which one pixel is formed of three-color subpixels) with little reduction in image quality and implement a source driver. As a result, it is possible to facilitate the implementation of a liquid crystal display device with a diagonal of 30 inches or more and resolution of 100 ppi or more.

Furthermore, in Embodiment 1, since, in each column of pixels, two RG-type pixels and two BG-type pixels are alternately placed and the G subpixels are placed checkerwise (one square of a lattice corresponds to two subpixels adjacent to each other in the column direction), it is possible to obtain higher perceived definition than the definition corresponding to the number of pixels.

Moreover, as in FIG. 5, when two lines are selected at the same time (per region of the first and the second regions), since it is possible to write a signal potential into two subpixels of the same color at the same time, the two subpixels adjacent to each other in the column direction, it is possible to suppress color crosstalk (interference that occurs when a signal potential is written into subpixels of different colors at the same time, the subpixels adjacent to each other in the column direction).

Incidentally, as the backlight BL, a direct backlight including a red LED, a blue LED, and a green LED is desirable, and it is preferable that the backlight BL includes a backlight adjusting portion that individually adjusts the brightness of each color.

Moreover, as in FIG. 1, when the R and B subpixels and the G subpixel are made to have the same area (by doing so, the G subpixels are placed more evenly, whereby the image quality is improved, and various parameters around the subpixel are uniformized, which facilitates image quality adjustment), in view of the relationship with white balance, the brightness of green whose number of pixels is greater than the number of pixels of red and blue is set at low brightness. Incidentally, the adjustment of white balance by the backlight is much easier than the adjustment of the transmittance of a color filter and the adjustment of the transmittance of the liquid crystal mode (the adjustment using different signal voltages at the same gray level) or the thickness adjustment of a liquid crystal layer in accordance with a color and can be said to be a good method from the standpoint of mass production.

Figure 6:
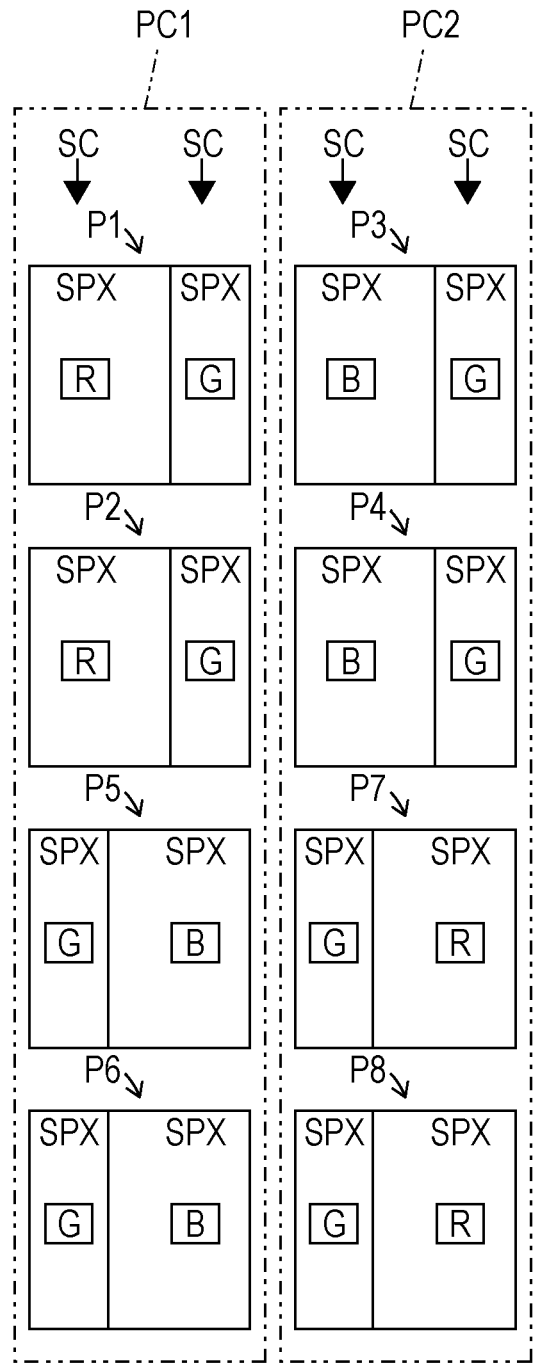
FIG. 6 is a schematic diagram depicting a modified example (about the area of a subpixel) of Embodiment 1.

However, for example, as depicted in FIG. 6, a configuration in which the G subpixel is made smaller than the R and B subpixels is also possible.

Figure 7:
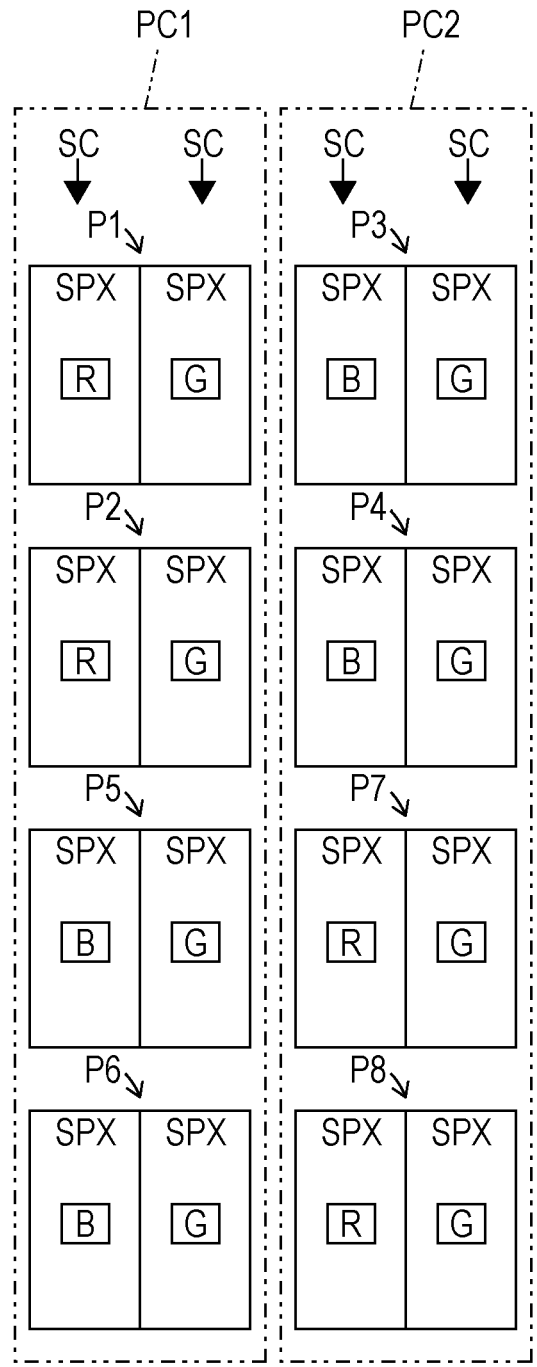
FIG. 7 is a schematic diagram depicting a modified example (about the color of a subpixel) of Embodiment 1.
Figure 15:
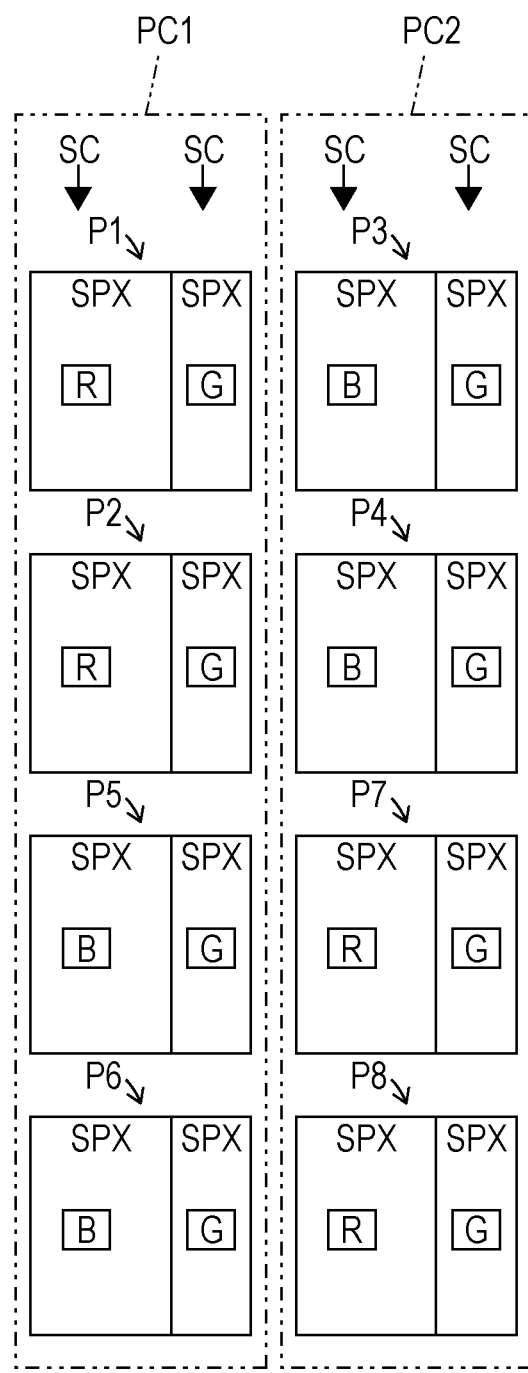
FIG. 15 is a schematic diagram depicting another modified example of the pixel array of Embodiment 1.

In the configuration of FIG. 1, in one (SC) of the two columns of subpixels adjacent to each other, two R subpixels and two G subpixels are alternately placed; in the other (SC), two B subpixels and two G subpixels are alternately placed, but the configuration is not limited thereto. For example, as depicted in FIG. 7, a configuration in which only the G subpixels are linearly placed in one (SC) of the two columns of subpixels adjacent to each other is also possible. Furthermore, as for the configuration of FIG. 7, as depicted in FIG. 15, it is possible to make the G subpixel smaller than the R and B subpixels.

[Embodiment 2]

Figure 8:
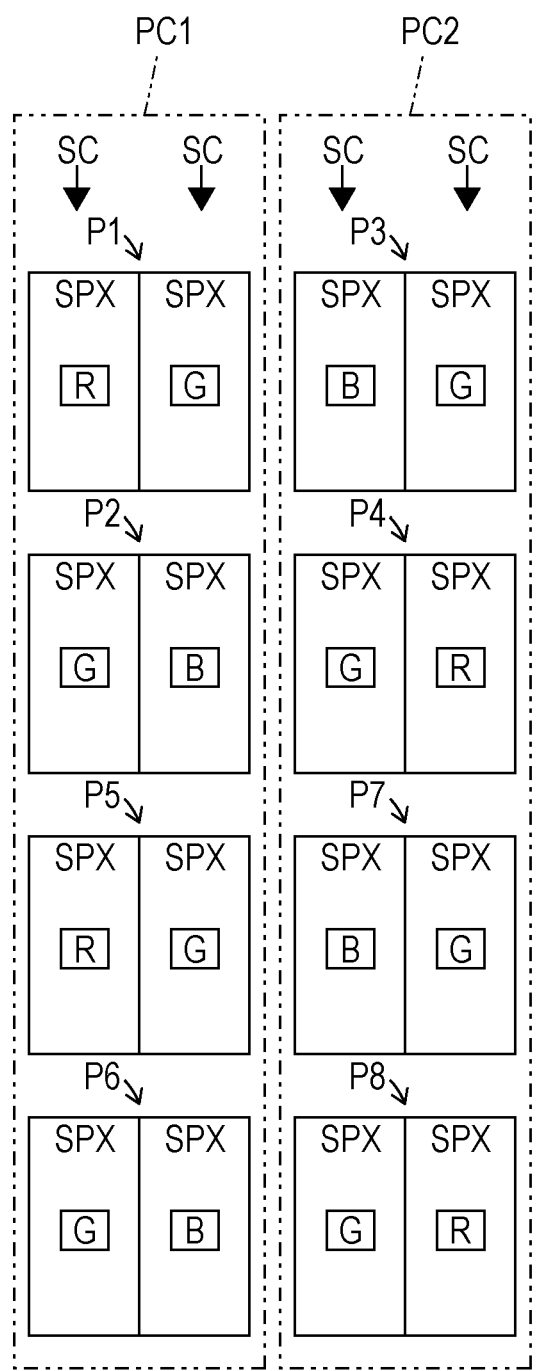
FIG. 8 is a schematic diagram depicting the pixel array of a liquid crystal display device of Embodiment 2.

FIG. 8 is a schematic diagram depicting the pixel array of a display portion in Embodiment 2. Incidentally, the size and resolution of the display portion are the same as those of Embodiment 1. As depicted in FIG. 8, a plurality of pixels of the display portion are classified into an RG-type pixel formed of a red (R) subpixel SPX and a green (G) subpixel SPX which are arranged in the row direction and a BG-type pixel formed of a blue subpixel and a green subpixel which are arranged in the row direction, and, in each column of pixels (PC1 or PC2), one RG-type pixel and one BG-type pixel are alternately placed; also in each row of pixels, one RG-type pixel and one BG-type pixel are alternately placed. Furthermore, in one (SC) of the two columns of subpixels adjacent to each other, one R subpixel and one G subpixel are alternately placed, and, in the other (SC), one B subpixel and one G subpixel are alternately placed.

Specifically, each of the pixel P1, the pixel P4, the pixel P5, and the pixel P8 is the RG-type, and each of the pixel P2, the pixel P3, the pixel P6, and the pixel P7 is the BG-type.

In addition, the R subpixel SPX of the pixel P1 and the B subpixel SPX of the pixel P2 pixel are placed diagonally across from each other, and the G subpixel SPX of the pixel P1 and the G subpixel SPX of the pixel P4 pixel are placed diagonally across from each other.

Although the display portion of Embodiment 2 is also formed of the RG-type pixels and the BG-type pixels, since the G subpixel which humans can recognize clearly is included in each pixel, it is possible to reduce the number of pixels in the row direction (the horizontal direction) to ⅔ (as compared to a case in which one pixel is formed of three-color subpixels) with little reduction in image quality and implement a source driver. As a result, it is possible to facilitate the implementation of a liquid crystal display device with a diagonal of 30 inches or more and resolution of 100 ppi or more.

Furthermore, in Embodiment 2, since one RG-type pixel and one BG-type pixel are alternately placed in each column of pixels and the G subpixels are placed checkerwise (one square of a lattice corresponds to one of the subpixels adjacent to each other in the column direction), it is possible to obtain higher perceived definition.

Figure 9:
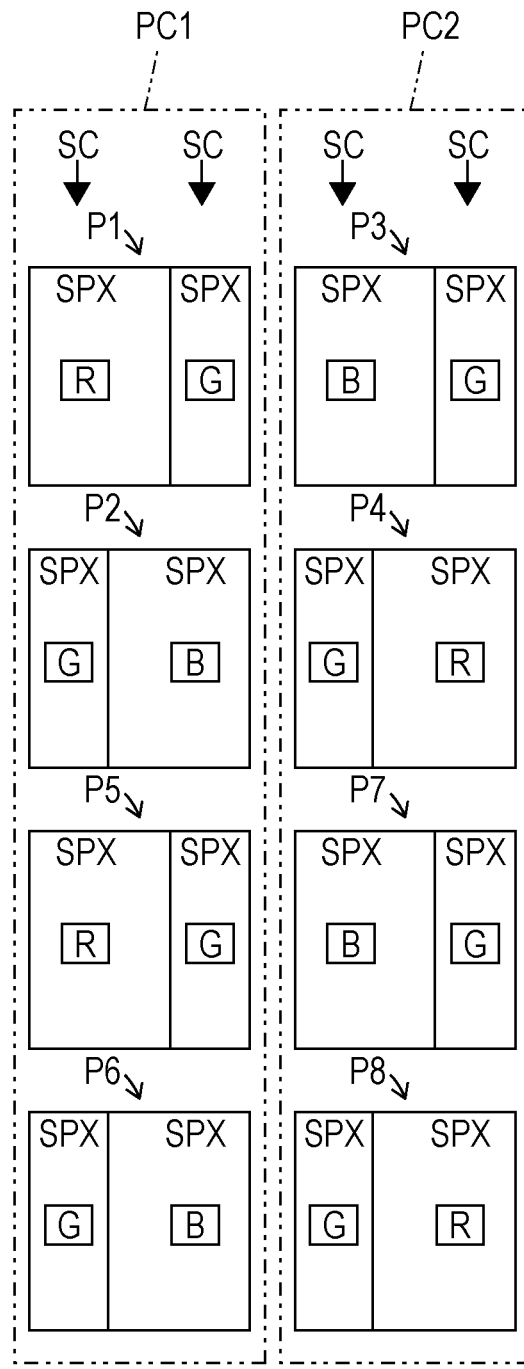
FIG. 9 is a schematic diagram depicting a modified example (about the color of a subpixel) of Embodiment 2.

Also in Embodiment 2, for example, as depicted in FIG. 9, a configuration in which the G subpixel is made smaller than the R and B subpixels is possible.

Figure 10:
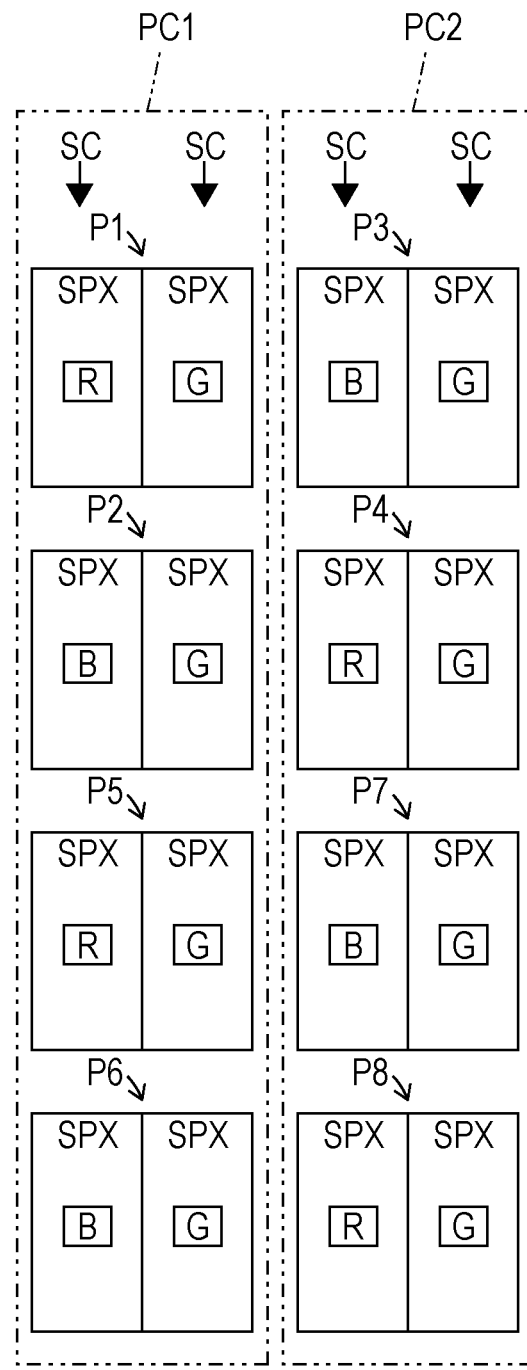
FIG. 10 is a schematic diagram depicting a modified example (about the color of a subpixel) of the pixel array of Embodiment 2.
Figure 16:
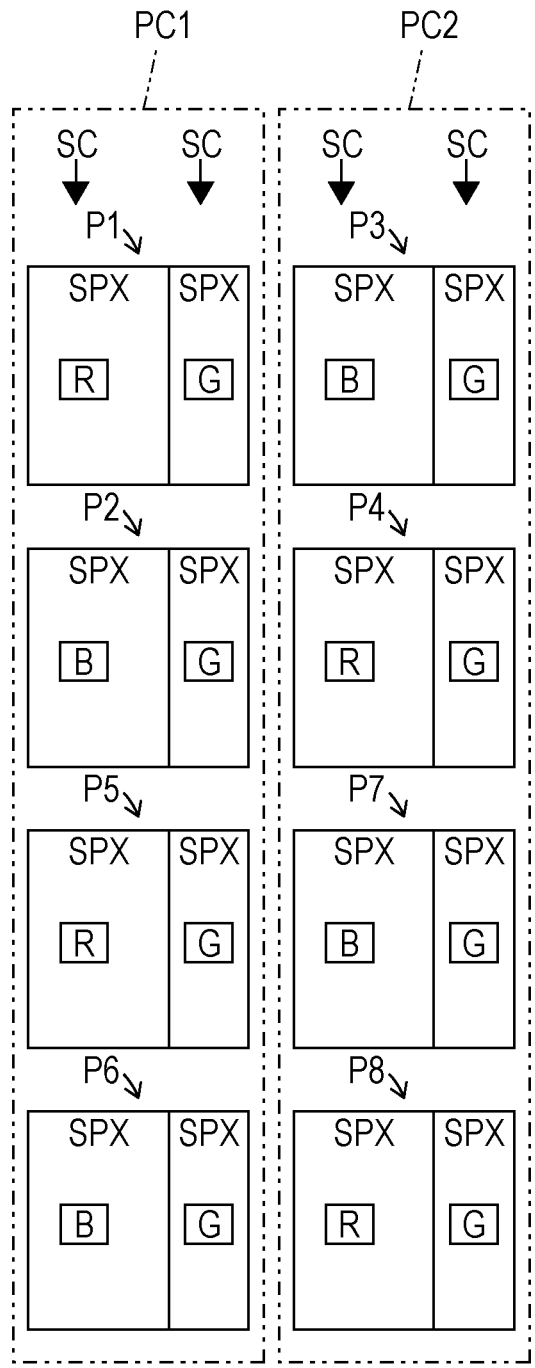
FIG. 16 is a schematic diagram depicting another modified example of the pixel array of Embodiment 2.

Moreover, for example, as depicted in FIG. 10, a configuration in which only the G subpixels are linearly placed in one (SC) of the two columns of subpixels adjacent to each other is also possible. Furthermore, as for the configuration of FIG. 10, as depicted in FIG. 16, it is possible to make the G subpixel smaller than the R and B subpixels.

[Embodiment 3]

Figure 11:
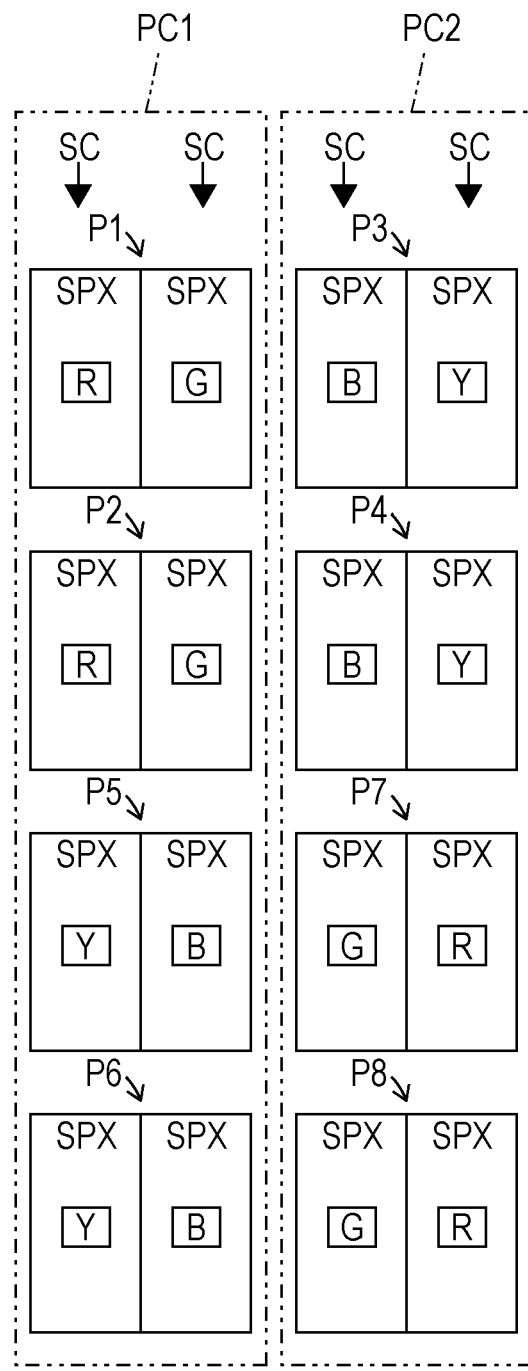
FIG. 11 is a schematic diagram depicting the pixel array of a liquid crystal display device of Embodiment 3.

FIG. 11 is a schematic diagram depicting the pixel array of a display portion in Embodiment 3. Incidentally, the size and resolution of the display portion are the same as those of Embodiment 1. As depicted in FIG. 11, a plurality of pixels of the display portion are classified into an RG-type pixel formed of a red (R) subpixel SPX and a green (G) subpixel SPX which are arranged in the row direction and a BY-type (BH-type) pixel formed of a blue (B) subpixel and a yellow (Y) subpixel which are arranged in the row direction, and, in each column of pixels (PC1 or PC2), two RG-type pixels and two BY-type pixels are alternately placed; in each row of pixels, one RG-type pixel and one BY-type pixel are alternately placed. Furthermore, in one (SC) of the two columns of subpixels adjacent to each other, two R subpixels and two Y subpixels are alternately placed, and, in the other (SC), two B subpixels and two G subpixels are alternately placed.

Specifically, each of the pixel P1, the pixel P2, the pixel P7, and the pixel P8 is the RG-type, and each of the pixel P3, the pixel P4, the pixel P5, and the pixel P6 is the BY-type.

In addition, the R subpixel SPX of the pixel P1 and the R subpixel SPX of the pixel P2 are adjacent to each other in the column direction, the B subpixel SPX of the pixel P5 and the B subpixel SPX of the pixel P6 are adjacent to each other in the column direction, and the R subpixel SPX of the pixel P2 and the B subpixel SPX of the pixel P5 pixel are placed diagonally across from each other.

Although the display portion of Embodiment 3 is formed of the RG-type pixels and the BY-type pixels, since the G or Y subpixel which humans can recognize clearly is included in each pixel, it is possible to reduce the number of pixels in the row direction (the horizontal direction) to ⅔ (as compared to a case in which one pixel is formed of three-color subpixels) with little reduction in image quality and implement a source driver. As a result, it is possible to facilitate the implementation of a liquid crystal display device with a diagonal of 30 inches or more and resolution of 100 ppi or more.

Furthermore, in Embodiment 3, since, in each column of pixels, two RG-type pixels and two BY-type pixels are alternately placed in each column of pixels and the Y/G subpixels are placed checkerwise (one square of a lattice corresponds to two subpixels adjacent to each other in the column direction), it is possible to obtain higher perceived definition.

In addition, since humans can recognize yellow more clearly than green, it is possible to obtain much higher perceived definition by mixing yellow subpixels. Moreover, since the transmittance is increased as compared to a case in which yellow is created by combining R subpixels and G subpixels and higher color purity is obtained, this contributes to low power consumption. To put it the other way around, it is possible to use a liquid crystal panel with higher definition (higher resolution) on the same consumed power.

Furthermore, as in Embodiment 1, when two lines are selected at the same time (per region of the first and the second regions), since it is possible to write a signal potential into two subpixels of the same color at the same time, the two subpixels adjacent to each other in the column direction, it is possible to suppress color crosstalk (interference that occurs when a signal potential is written into subpixels of different colors at the same time, the subpixels adjacent to each other in the column direction).

Figure 18:
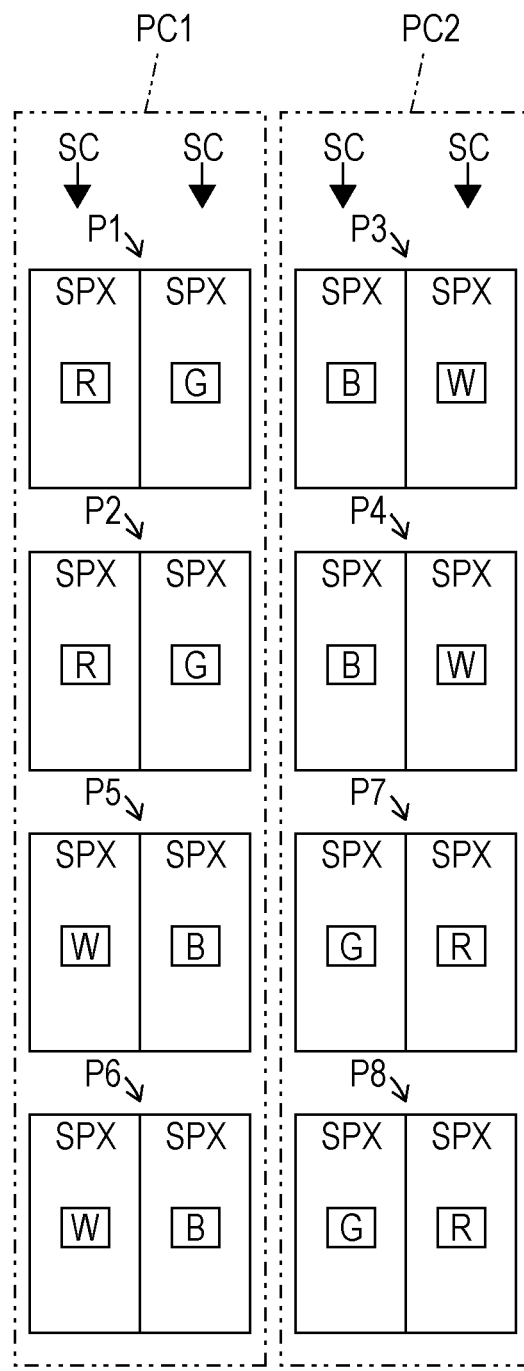
FIG. 18 is a schematic diagram depicting a mode obtained by replacing the yellow pixel of FIG. 11 with a white pixel.
Figure 19:
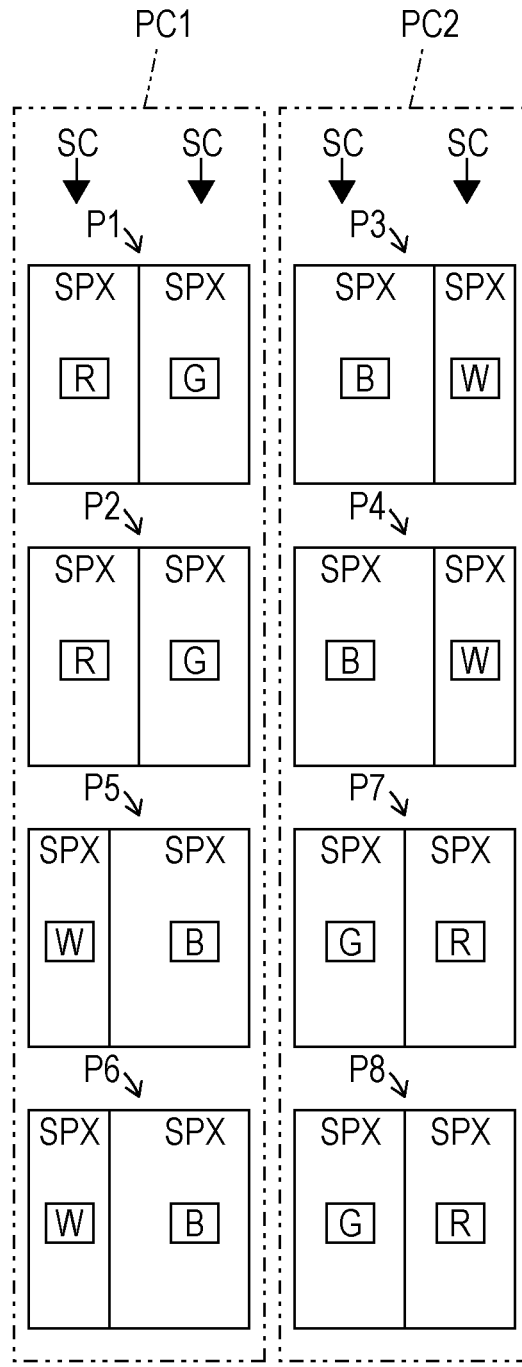
FIG. 19 is a schematic diagram depicting a modified example of FIG. 19.
Figure 20:
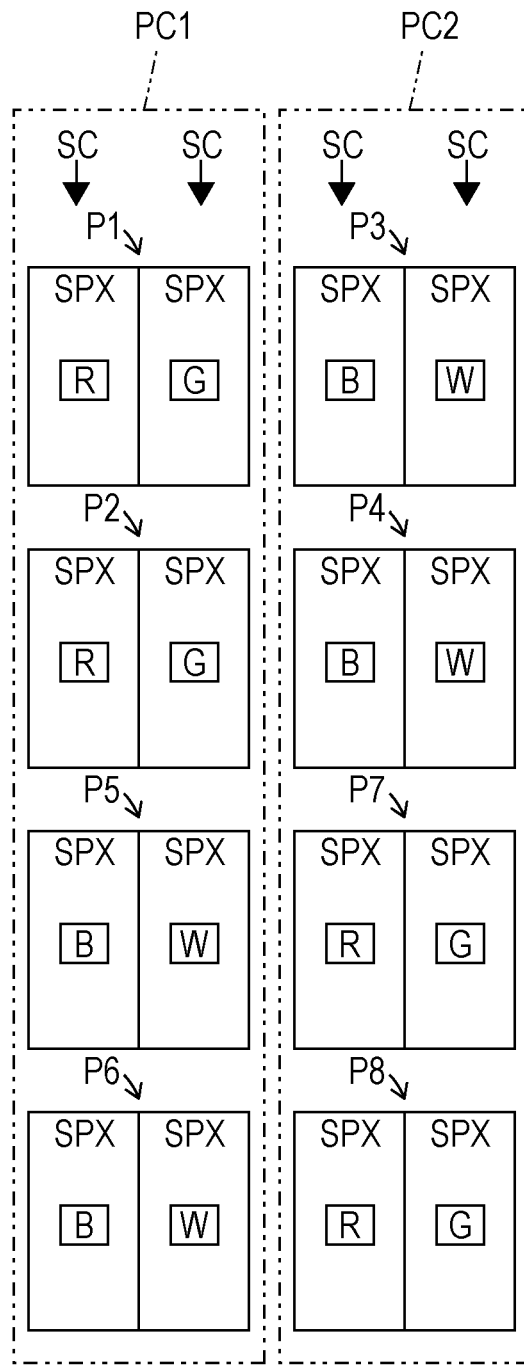
FIG. 20 is a schematic diagram of a mode obtained by replacing the yellow pixel of FIG. 12 with a white pixel.

In this liquid crystal display device, a configuration in which the Y subpixel of FIG. 11 is replaced with a white (W) subpixel is also possible (refer to FIG. 18). By doing so, it is possible to increase light use efficiency. As for the configuration of FIG. 18, as depicted in FIG. 19, it is possible to make only the W subpixel smaller than the G, R, and B subpixels.

Figure 12:
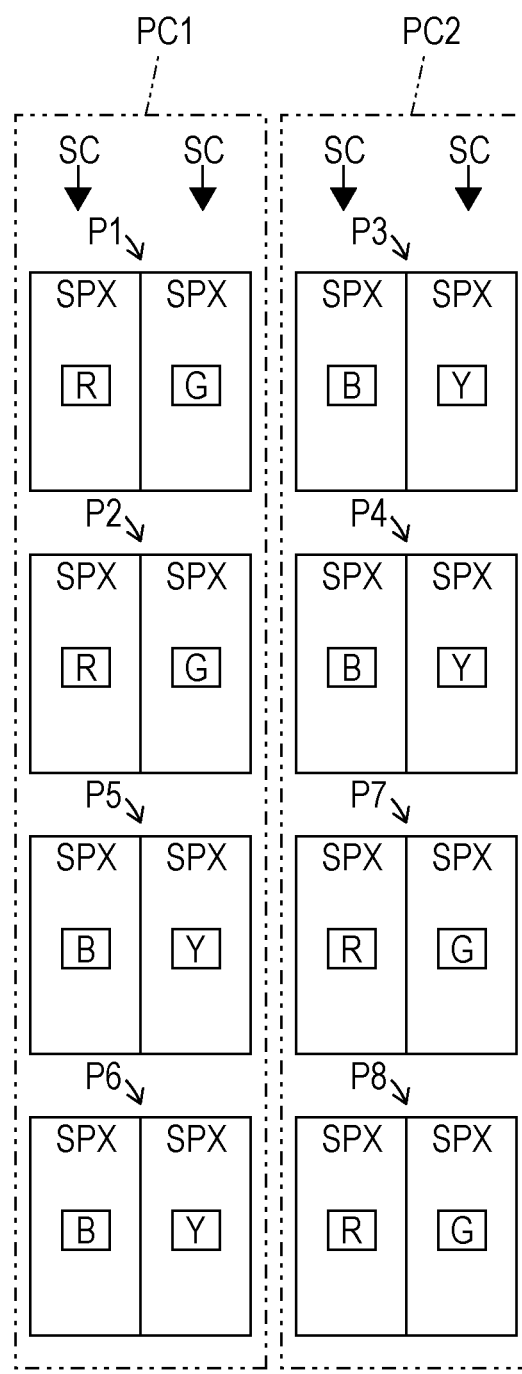
FIG. 12 is a schematic diagram depicting a modified example of the pixel array of Embodiment 3.
Figure 17:
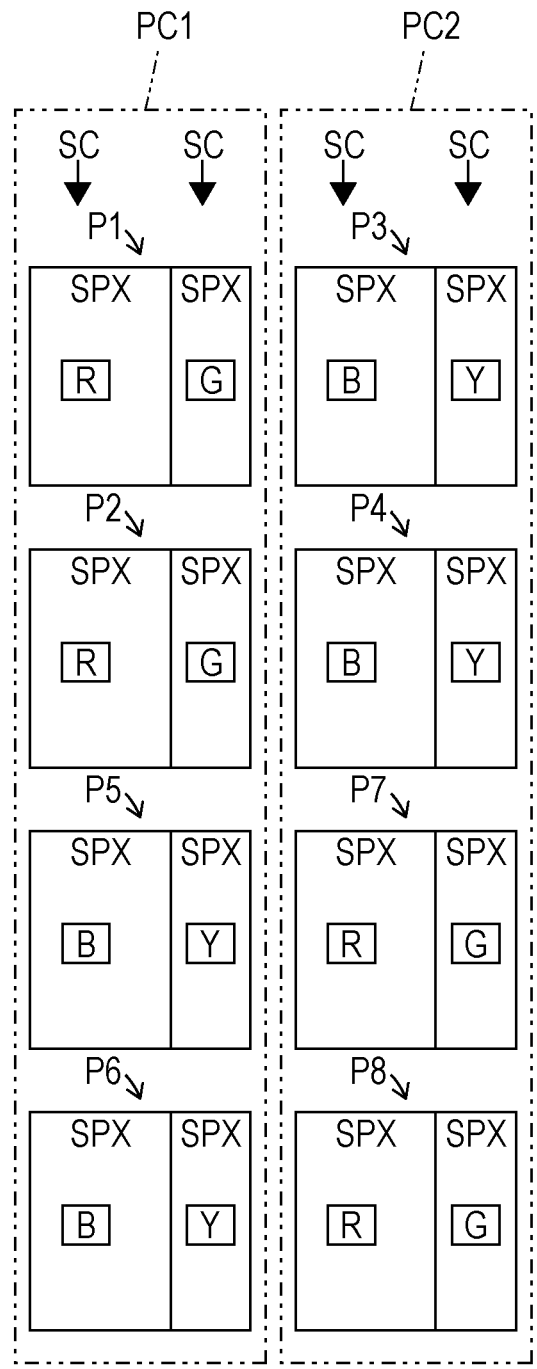
FIG. 17 is a schematic diagram depicting another modified example of the pixel array of Embodiment 3.

Also in Embodiment 3, for example, as depicted in FIG. 12, a configuration in which, in one (SC) of the two columns of subpixels adjacent to each other, only the G and Y subpixels are linearly placed is also possible. As for the configuration of FIG. 12, as depicted in FIG. 17, it is possible to make the G and Y subpixels smaller than the R and B subpixels. Moreover, a configuration in which the Y subpixel of FIG. 12 is replaced with a white (W) subpixel is also possible (refer to FIG. 20).

Figure 13:
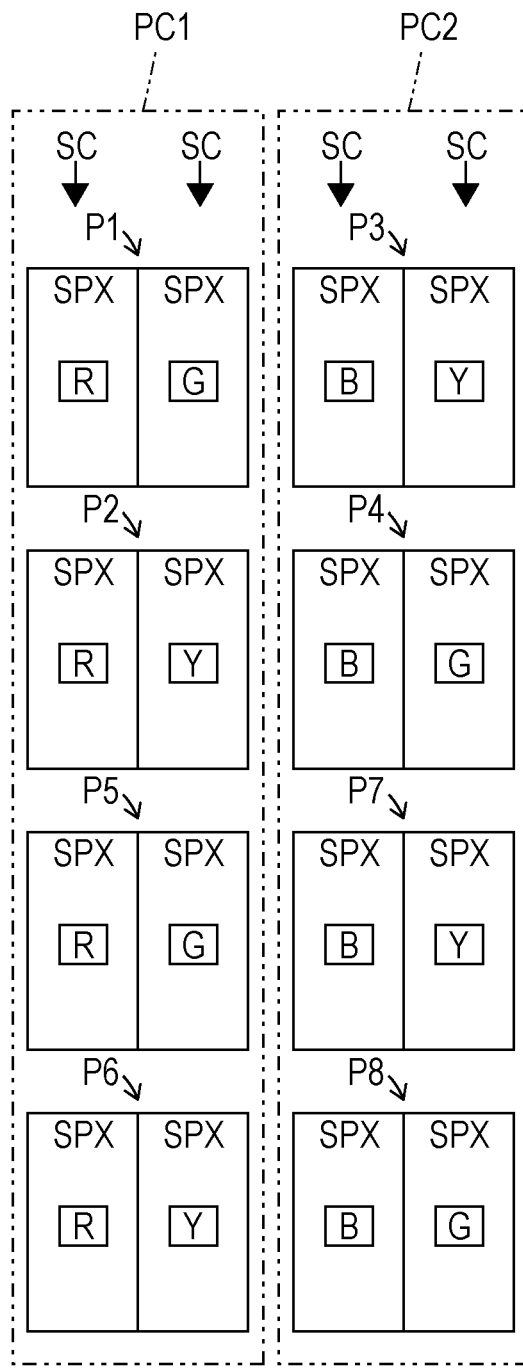
FIG. 13 is a schematic diagram depicting another modified example of the pixel array of Embodiment 3.

Furthermore, as depicted in FIG. 13, a configuration in which the plurality of pixels of the display portion are classified into an RG-type pixel formed of a red (R) subpixel SPX and a green (G) subpixel SPX which are arranged in the row direction, an RY-type pixel formed of a red (R) subpixel SPX and a yellow (Y) subpixel SPX which are arranged in the row direction, a BY-type (BH-type) pixel formed of a blue (B) subpixel and a yellow (Y) subpixel which are arranged in the row direction, and a BG-type pixel formed of a blue (B) subpixel and a red (G) subpixel which are arranged in the row direction, in the PC1, one RG-type pixel and one RY-type pixel are alternately placed, in the PC2, one BY-type pixel and one BG-type pixel are alternately placed, and, in one (SC) of the two columns of subpixels adjacent to each other, only the G and Y subpixels are linearly placed is also possible.

When one green pixel and one yellow pixel are alternately arranged as in FIG. 13 and two lines are selected at the same as in FIG. 5, color crosstalk can occur in principle, but, according to the analysis carried out by the inventor, the impact of the color crosstalk is insignificant in a natural image (an image of an actual object taken by a camera) because of a strong correlation between the green and yellow components, and green and yellow can be treated as colors in the same range.

Figure 21:
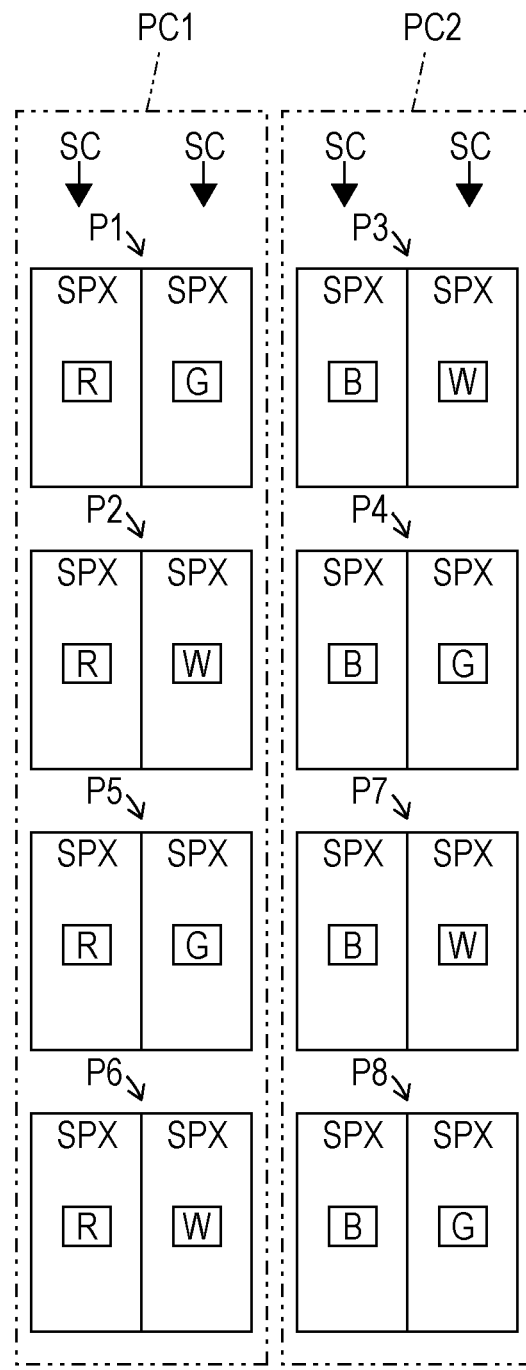
FIG. 21 is a schematic diagram depicting a mode obtained by replacing the yellow pixel of FIG. 13 with a white pixel.

Incidentally, a configuration in which the Y subpixel of FIG. 13 is replaced with a white (W) subpixel is also possible (refer to FIG. 21).

[Embodiment 4]

Figure 14:
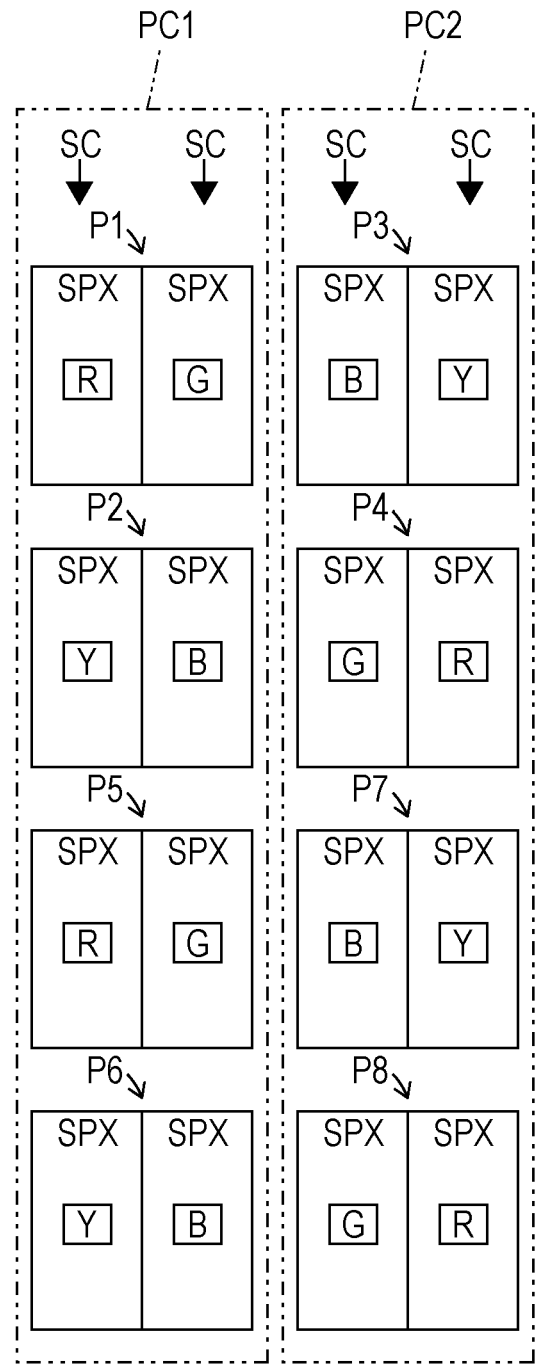
FIG. 14 is a schematic diagram depicting the pixel array of a liquid crystal display device of Embodiment 4.

FIG. 14 is a schematic diagram depicting the pixel array of a display portion in Embodiment 4. Incidentally, the size and resolution of the display portion are the same as those of Embodiment 1. As depicted in FIG. 14, a plurality of pixels of the display portion are classified into an RG-type pixel formed of a red (R) subpixel SPX and a green (G) subpixel SPX which are arranged in the row direction and a BY-type (BH-type) pixel formed of a blue subpixel and a yellow subpixel which are formed in the row direction, in each column of pixels (PC1 or PC2), one RG-type pixel and one BY-type pixel are alternately placed, and, in each row of pixels, one RG-type pixel and one BY-type pixel are alternately placed. Furthermore, in one (SC) of the two columns of subpixels adjacent to each other, one R subpixel and one Y subpixel are alternately placed, and, in the other (SC), one B subpixel and one G subpixel are alternately placed.

Specifically, each of the pixel P1, the pixel P4, the pixel P5, and the pixel P8 is the RG-type, and each of the pixel P2, the pixel P3, the pixel P6, and the pixel P7 is the BY-type.

In addition, the R subpixel SPX of the pixel P1 and the B subpixel SPX of the pixel P2 pixel are placed diagonally across from each other, and the G subpixel SPX of the pixel P1 and the G subpixel SPX of the pixel P4 pixel are placed diagonally across from each other.

Although the display portion of Embodiment 4 is also formed of the RG-type pixels and the BY-type pixels, since the Y or G subpixel which humans can recognize clearly is included in each pixel, it is possible to reduce the number of pixels in the row direction (the horizontal direction) to ⅔ (as compared to a case in which one pixel is formed of three-color subpixels) with little reduction in image quality and implement a source driver. As a result, it is possible to facilitate the implementation of a liquid crystal display device with a diagonal of 30 inches or more and resolution of 100 ppi or more.

Furthermore, in Embodiment 2, since one RG-type pixel and one BY-type pixel are alternately placed in each column of pixels and the G subpixels are placed checkerwise (one square of a lattice corresponds to one of the subpixels adjacent to each other in the column direction), it is possible to obtain higher perceived definition.

Figure 22:
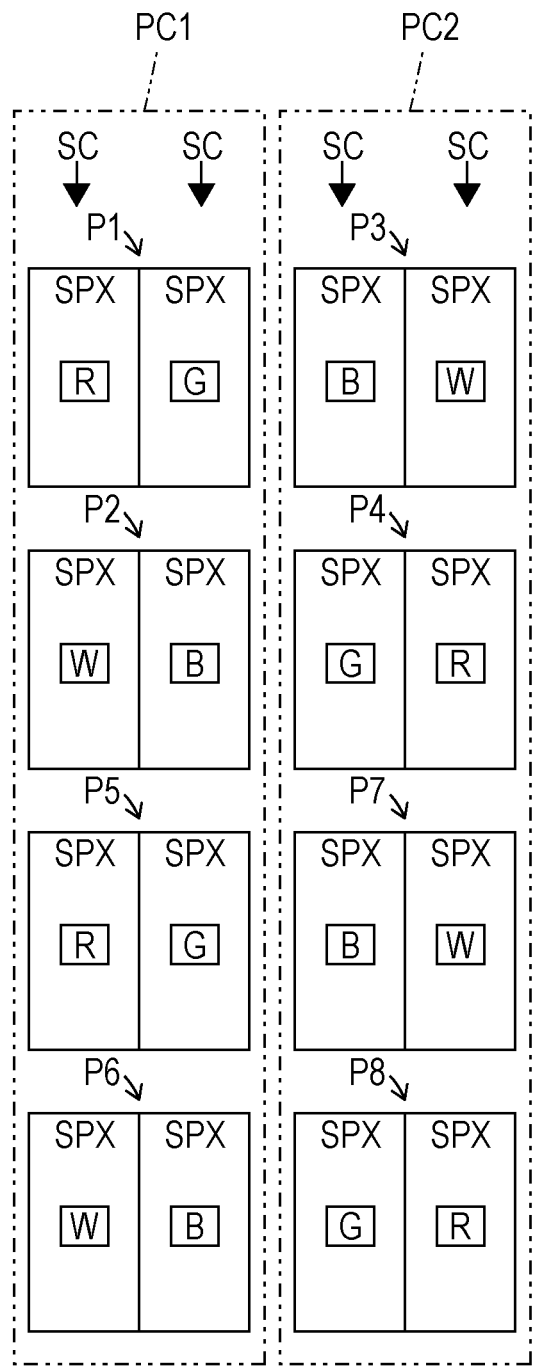
FIG. 22 is a schematic diagram depicting a mode obtained by replacing the yellow pixel of FIG. 14 with a white pixel.

Incidentally, a configuration in which the Y subpixel of FIG. 14 is replaced with a white (W) subpixel is also possible (refer to FIG. 22).

The present invention is not limited to the embodiments described above, and the embodiment of the present invention also includes an embodiment obtained by appropriately modifying the above-described embodiments based on the common technical knowledge and an embodiment obtained by combining them.

INDUSTRIAL APPLICABILITY

The liquid crystal display device of the present invention is suitable for various liquid crystal displays and liquid crystal televisions, for example.

REFERENCE SIGNS LIST

LCD liquid crystal display device
LCP liquid crystal panel

DCC display control circuit
P1 to P8 pixel
SPX subpixel
PC1, PC2 column of pixels
SC column of subpixels
DT driver chip
SDA, SDB source driver
GDA, GDB, gda, gdb gate driver
BL backlight

The invention claimed is:

1. A direct-view-type liquid crystal display device including a display portion in which a plurality of pixels are placed in a matrix, the display portion including a diagonal measure of 30 inches or more, wherein
a resolution of the display portion is 100 pixels or more per inch,
the plurality of pixels include first to fourth pixels;
one of the first to fourth pixels is an RG-type formed of a red subpixel and a green subpixel and another of the first to fourth pixels is a BH-type formed of a blue subpixel and a green, yellow, or white subpixel;
in each of the first to fourth pixels, two subpixels are arranged in a row direction along a scanning signal line;
the first pixel of the first to fourth pixels is an RG-type and the third pixel of the first to fourth pixels is a BH-type, the first pixel of the RG-type and the third pixel of the BH-type being adjacent in the row direction;
in one of two columns of pixels adjacent to each other, the first pixel and the second pixel of the first to fourth pixels are arranged sequentially, in the other of the two columns of pixels adjacent to each other, the third pixel and the fourth pixel of the first to fourth pixels are arranged sequentially, and the second and fourth pixels are adjacent to each other in the row direction;
the second pixel is the RG-type;
the fourth pixel is the BH-type;
the plurality of pixels includes fifth to eighth pixels, and, in each of the fifth to eighth pixels, two subpixels are arranged in the row direction;
in one of the two columns of pixels, the first and second pixels and the fifth and sixth pixels of the plurality of pixels are arranged sequentially, in the other of the two columns of pixels, the third and fourth pixels and the seventh and eighth pixels of the plurality of pixels are arranged sequentially, the fifth and seventh pixels are adjacent to each other in the row direction, and the sixth and eighth pixels are adjacent to each other in the row direction;
each of the fifth and sixth pixels is the BH-type; and
each of the seventh and eighth pixels is the RG-type.

2. The liquid crystal display device according to claim 1, wherein
the red subpixel included in the first pixel and the red subpixel included in the second pixel are adjacent to each other in the column direction, and the blue subpixel included in the fifth pixel and the blue subpixel included in the sixth pixel are adjacent to each other in the column direction.

3. The liquid crystal display device according to claim 2, wherein
the green subpixel of the second pixel and the green or yellow subpixel of the fifth pixel are placed diagonally across from each other.

4. The liquid crystal display device according to claim 2, wherein
the green subpixel of the second pixel and the green or yellow subpixel of the fifth pixel are adjacent to each other in the column direction.

5. The liquid crystal display device according to claim 2, wherein
the first and third pixels are connected to a first scanning signal line, and the second and fourth pixels are connected to a second scanning signal line, and the first and second scanning signal lines are selected at a same time.

6. The liquid crystal display device according to claim 1, wherein
in the first to fourth pixels, an area of the green or yellow subpixel is equal to an area of the red or blue subpixel.

7. The liquid crystal display device according to claim 6, comprising:
a direct backlight including a red LED, a blue LED, and a green LED, wherein
a brightness of green of the backlight is set to be lower than a brightness of red and blue.

8. The liquid crystal display device according to claim 1, wherein
a liquid crystal layer of each subpixel is in a multi-domain vertical alignment mode.

9. The liquid crystal display device according to claim 1, wherein
the display portion is divided into a first region on an upstream side in a scanning direction and a second region on a downstream side in the scanning direction, and a plurality of data signal lines formed in the first region and a plurality of data signal lines formed in the second region are separated from each other, and
scanning of the first region and scanning of the second region are concurrently performed.

* * * * *